A. ROMADKA.

TRUNK.

No. 7,081. Reissued April 25, 1876.

Witnesses:
Grenville Lewis
Jos. C. Wildman

Inventor
A. Romadka
by Stansbury & Munn
his Attys.

N. PETERS, PHOTO-LITHOGRAPHER, WASHINGTON, D. C.

UNITED STATES PATENT OFFICE.

ANTHONY ROMADKA, OF MILWAUKEE, WISCONSIN, ASSIGNOR TO ROMADKA BROTHERS.

IMPROVEMENT IN TRUNKS.

Specification forming part of Letters Patent No. 158,317, dated December 29, 1874; reissue No. 7,081, dated April 25, 1876; application filed March 15, 1876.

*To all whom it may concern:*

Be it known that I, ANTHONY ROMADKA, of the city of Milwaukee and State of Wisconsin, have invented certain new and useful Improvements in Combined Self-Supporting Corner-Clamp Hinges for Trunks; and I do hereby declare that the following is a full, clear, and exact description of the same, reference being had to the accompanying drawings, in which similar letters indicate like parts, and in which—

Figure 1:
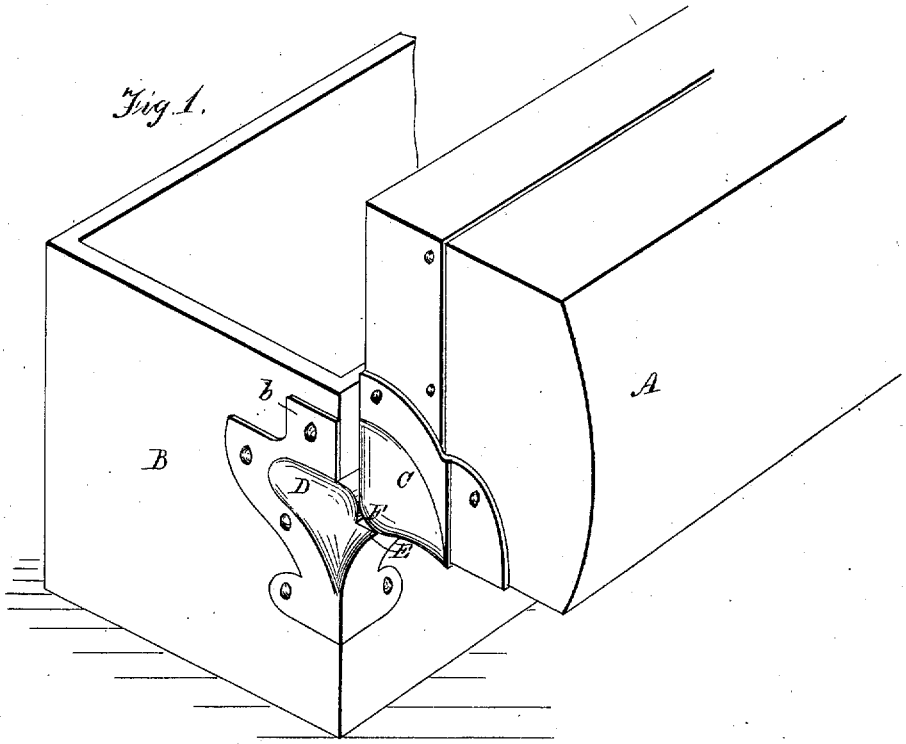
Figure 2:
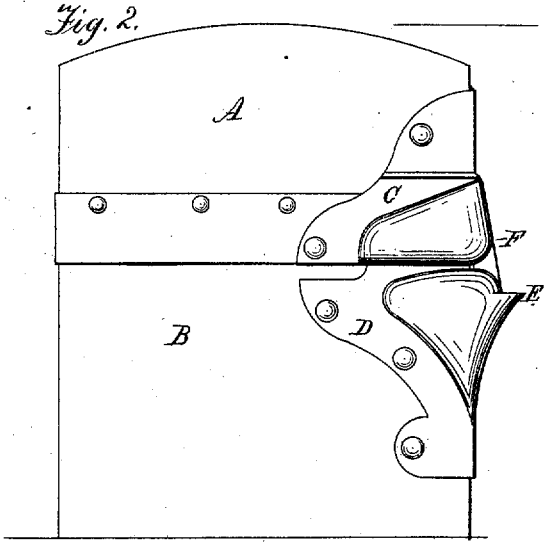
Figure 3:
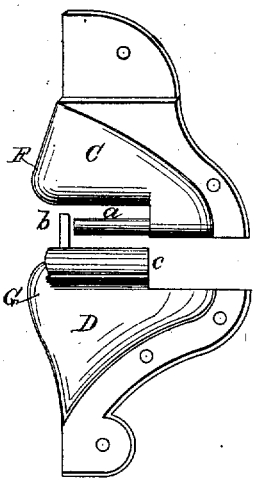

Figure 1 is a perspective view of my self-supporting corner-clamp hinge applied to a trunk, showing its operation when the top or lid is thrown back. Fig. 2 is a side view of the same, showing its position when the lid is closed; and Fig. 3 is a rear view of the parts of the hinge detached and separate.

The object of my invention is to produce a self-supporting hinge and corner-clamp combined for trunks, that shall consist of only two parts, so constructed that, when applied, they will serve as protecting and strengthening clamps for the corners of the trunk, self-supporting hinges for its lid when thrown open and back, the swells or strengthened parts of the same coming in contact and receiving the strain, and will also serve to prevent any lateral motion of the lid when closed.

The invention consists of an upper corner-clamp, provided with a strengthening-bulb and a re-entering pin, all cast in one piece, and of a lower corner-clamp, provided with a similar strengthening-bulb and a socketed bulb for receiving the pin of the upper clamp, and also with a supporting-flange on its rear side, and a lip on the end for entering the inside of the upper clamp when the lid is closed, all in like manner cast in one piece.

In the drawings, A and B represent the lid or cover and body of a trunk, respectively, and C and D the combined self-supporting hinge and corner-clamps. The upper clamp and leaf C of the hinge is cast in the form of a corner, with a strengthening-bulb, F, as shown in all the figures, and with a re-entering pin, *a*, as shown in Fig. 3. The lower clamp and leaf D of the hinge is cast in like form with a strengthening-bulb, G, a supporting-flange, E, extending along its rear side, a socketed bulb, *c*, for receiving the re-entering pin *a* on the same side, and a lip, *b*, on the end, for entering the inside of the upper corner-clamp, as shown in the figures.

When thus constructed they are applied and attached to a trunk, as shown in Figs. 1 and 2, the clamps embracing the corners and the pins entering the socketed bulbs to form the hinges.

The operation and advantages of these devices thus constructed and applied will be readily seen and understood.

When the lid of the trunk is thrown back the bulb F of the upper clamp and leaf of the hinge will rest upon the flange E and bear against the bulb G of the lower clamp and leaf of the hinge, as clearly shown in Fig. 1, and in such a manner as to bring the strain at the corners when they are the strongest.

When the lid is closed the lip or flange *b* on the lower clamps will enter within the sides of the upper clamps, as shown in Fig. 2, and thus prevent any lateral motion of the parts.

It is obvious that the parts may be cast of any size desired, and of any suitable material, and that their inner surface may be cast to conform to the outer surface of the trunk, as shown.

I am aware that a combined corner-clamp and hinge has been made self-supporting by means of a spur or stop projecting from the central part of the eye of the upper leaf of the hinge, but without strengthening-bulbs to receive and bear the strain by coming in contact. This I do not claim; but,

Having thus described my invention, what I do claim is—

1. A self-supporting corner hinge and clamp combined for trunks, consisting of a clamp, C, cast with a strengthening-bulb and re-entering pin *a*, and a clamp, D, cast with a similar bulb, a supporting-flange, and socketed bulb, substantially as and for the purpose set forth.

2. In a combined clamp-hinge for trunks, the re-entering pin *a* and socketed bulb *c*, when cast with the parts of the same, as and for the purpose set forth.

3. In a self-supporting combined clamp and hinge for trunks, the longitudinal supporting-flange E, cast with and upon the rear side of the lower clamp and hinge, as set forth.

The specification of my said invention signed and witnessed, at Milwaukee, this 26th day of January, A. D. 1876.

ANTHONY ROMADKA.

Witnesses:

D. C. MILLETT,

CHAS. E. LAVERTY.